(12) United States Patent
Taylor et al.

(10) Patent No.: US 8,894,896 B2
(45) Date of Patent: Nov. 25, 2014

(54) POLYMERIC GARMENT MATERIAL

(75) Inventors: John Arthur Taylor, Broseley (GB); Agampodl Sunil Shantha Mendis, Kosgoda (LK); Mohamed Fazal Abdeen, Narahenpita (LK); Howard William Thomas Goth, Holmfirth (GB)

(73) Assignee: A T G Ceylon (Private) Limited, IPZ Katunayake (LK)

( * ) Notice: Subject to any disclaimer, the term of this patent is extended or adjusted under 35 U.S.C. 154(b) by 1161 days.

(21) Appl. No.: 10/538,054

(22) PCT Filed: Nov. 20, 2004

(86) PCT No.: PCT/GB2004/004900
§ 371 (c)(1),
(2), (4) Date: Jan. 13, 2006

(87) PCT Pub. No.: WO2005/088005
PCT Pub. Date: Sep. 22, 2005

(65) Prior Publication Data
US 2006/0189240 A1 Aug. 24, 2006

(30) Foreign Application Priority Data
Mar. 31, 2004 (GB) .................................. 0407210.4

(51) Int. Cl.
B29C 67/00 (2006.01)
(Continued)

(52) U.S. Cl.
CPC ............. B29C 41/14 (2013.01); D06N 3/0043 (2013.01); B29C 41/34 (2013.01); A41D 19/0065 (2013.01); B29K 2105/04 (2013.01); A41D 31/0011 (2013.01); B29C 67/06 (2013.01); A41D 2400/22 (2013.01); B29L 2031/4871 (2013.01); B29L 2031/4864 (2013.01); B29L 2031/48 (2013.01)

USPC .......... 264/46.4; 264/413; 264/414; 264/415; 264/45.1; 264/45.2; 264/45.3; 264/45.4; 264/45.5; 264/45.6; 264/301; 264/303; 264/304; 264/305; 264/306; 264/307; 264/215; 264/255

(58) Field of Classification Search
USPC ............ 264/46.4, 561, 36.11, 45.6, 916, 415, 264/45.1, 48, 413, 414, 45.2, 45.3, 45.4, 264/45.5, 301, 303, 304, 305, 306, 215, 255
See application file for complete search history.

(56) References Cited

U.S. PATENT DOCUMENTS 2,293,927 A 8/1942 Beal
2,482,418 A * 9/1949 Jenkins ........................ 264/450

(Continued)

FOREIGN PATENT DOCUMENTS

EP 0 134 484 A1 3/1985
EP 1 591 471 A1 11/2005

(Continued)

OTHER PUBLICATIONS

Annex to the Summons issued in European Patent No. EP 07 012 481.3 0, Jul. 10, 2013, 3 pages.

(Continued)

Primary Examiner — Jeffrey Wollschlager
Assistant Examiner — Stella Yi
(74) Attorney, Agent, or Firm — Wegman, Hessler & Vanderburg

(57) ABSTRACT

A method of making garment material, the method having the steps: applying coagulant (34) to a substrate (32); applying a foam (38) of the polymeric material to the substrate (32); allowing the coagulant (34) to coagulate some of the foam (38); and removing uncoagulated foam (38) from the substrate (32) to leave a layer of coagulated polymeric material on the substrate (32).

18 Claims, 7 Drawing Sheets

Figure 1:
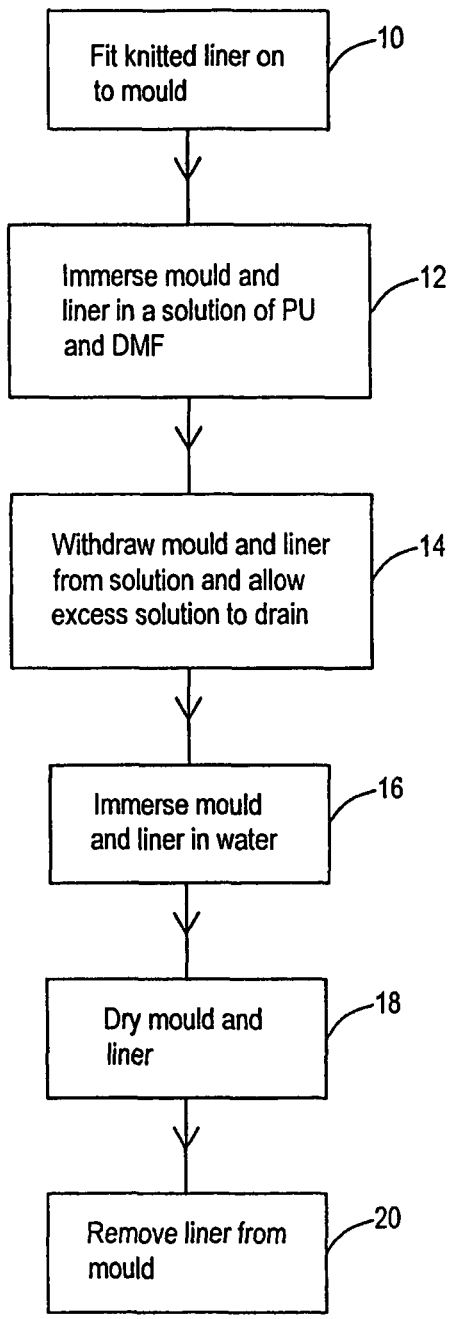

(51) Int. Cl.
*D06N 3/00* (2006.01)
*B29C 41/34* (2006.01)
*A41D 19/00* (2006.01)
*A41D 31/00* (2006.01)
*B29C 41/14* (2006.01)
*B29K 105/04* (2006.01)
*B29C 67/06* (2006.01)
*B29L 31/48* (2006.01)

(56) References Cited

U.S. PATENT DOCUMENTS

| | | | |
|---|---|---|---|
| 3,079,274 | A | 2/1963 | Marsden et al. |
| 3,665,157 | A | 5/1972 | Harada |
| 3,846,156 | A | 11/1974 | Seibert et al. |
| 4,059,659 | A | 11/1977 | Hilterhaus |
| 4,190,685 | A | 2/1980 | Hart et al. |
| 4,218,779 | A | 8/1980 | Hart et al. |
| 4,439,473 | A | 3/1984 | Lippman |
| 4,497,072 | A | 2/1985 | Watanabe |
| 4,514,460 | A | 4/1985 | Johnson |
| 4,515,851 | A | 5/1985 | Johnson |
| 4,519,098 | A * | 5/1985 | Dunmire et al. ............... 2/161.8 |
| 4,555,813 | A | 12/1985 | Johnson |
| 4,707,400 | A | 11/1987 | Towery |
| 4,743,470 | A | 5/1988 | Nachtkamp et al. |
| 4,833,173 | A * | 5/1989 | Spek et al. ............... 521/72 |
| 5,948,707 | A | 9/1999 | Crawley et al. |
| 6,348,258 | B1 | 2/2002 | Topolkaraev et al. |
| 6,475,562 | B1 * | 11/2002 | Vogt et al. ............... 427/244 |
| 6,599,849 | B1 | 7/2003 | Vogt et al. |
| 2002/0002405 | A1 * | 1/2002 | Janusson et al. ............... 623/36 |
| 2002/0076503 | A1 | 6/2002 | Borreani et al. |
| 2002/0197924 | A1 * | 12/2002 | Halley et al. ............... 442/148 |
| 2003/0066120 | A1 | 4/2003 | Tremblay-Lutter |
| 2003/0090037 | A1 * | 5/2003 | Woodford et al. ....... 264/331.13 |

FOREIGN PATENT DOCUMENTS

| | | |
|---|---|---|
| GB | 717103 | 10/1954 |
| GB | 1365734 | 9/1974 |
| JP | 63197571 A | 8/1988 |
| JP | 2033317 | 2/1990 |
| JP | 3161501 | 7/1991 |
| JP | 7279044 | 10/1995 |
| JP | 3161501 B2 | 4/2001 |
| JP | 2003268613 A | 9/2003 |
| KR | 1020040100168 A | 12/2004 |
| WO | WO 95/26650 | 10/1995 |
| WO | WO 98/06891 | 2/1998 |
| WO | WO 99/48393 | 9/1999 |
| WO | WO 01/58656 A1 | 8/2001 |
| WO | WO 2004/093580 A2 | 11/2004 |

OTHER PUBLICATIONS

European Committee for Standardization, "Protective Gloves—General Requirements and Test Methods", European Standard, vol. EN 420:1994, Sep. 2003, 9 pages.
Ansell Occupational Healthcare Brochure, 2002, 7 pages.
Lycra, "What is Lycra Fiber?", http://www.toray-opt.co.jp/whatslycra/index.html, Japanese and English translations, Jul. 15, 2010, 4 pages total.
JIS Japanese Industrial Standard, JIS L 1099:2006—(JTETC), "Testing Methods for Water Vapour Permeability of Textiles", English translation, 2006, 12 pages.
"First Launch to the Market Summary", 2004, 24 pages.
Zorb-IT, Email referring to Zorb-IT picture and sales sheets, Jun. 10, 2010, 5 pages.
Zorb-IT Sell Sheet Summary, 2010, 7 pages.
Email with reference to a public prior use of Zorb-IT gloves, Jul. 20, 2010, 1 page.
Carl, "Neoprene Latex—Principles of Compounding and Processing", Elastomer Chemicals Department, E. I. DuPont, De Nemours & Co. (Inc.), Wilmington, DE, Jul. 1962, 13 pages.
Letter from the Law Offices of Marshall & Melhorn, LLC, Toledo, Ohio, May 15, 2014.
Cook et al. "Neoprene Dipped Goods", Rubber Chemicals Division, E.. du Pont de Nemours & Co. (Inc.), Report No. 52-3, Dec. 1952.
Gelbert et al., "Neoprene Latex and Its Applications with Emphasis on Manufacture of Dipped Goods", presented May 27, 1987 at the Latex Technology Symposium in Montreal, Quebec, Dupont Company.
Letter from Stevens Hewlett & Perkins, Bristol, England, Sep. 21, 2010.
Declaration of Paul McMorrow, Quality Coordinator for Ansell Healthcare Products LLC, Sep. 8, 2010, 3 pages.
Declaration of Robert Gaither, Vice President of Sales & Marketing North America for Ansell Protective Products Inc., with Exhibits A-1, A-2, B-1, B-2, Sep. 13, 2010, 5 pages.
Experimental Report II, Presented in Opposition Against EP 1852548, Nov. 20, 2004.
"Reasons for the Petition", English Translation of Revocation Act against Korean Patent Application issued Dec. 23, 2011, Translation issued Jan. 20, 2012, 35 pages.

* cited by examiner

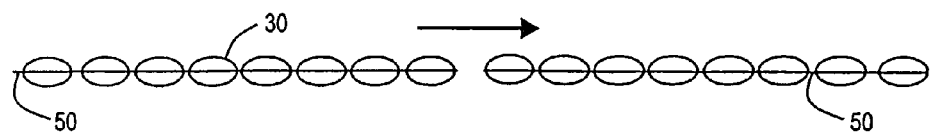
Fig. 5
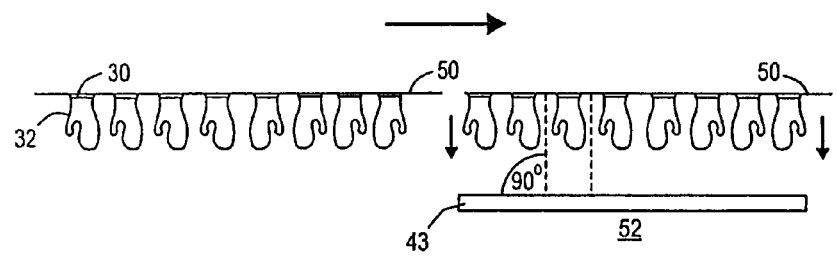
Fig. 6
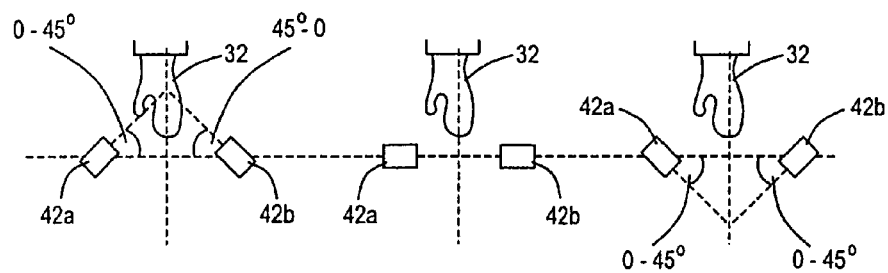
Fig. 7  Fig. 8  Fig. 9

POLYMERIC GARMENT MATERIAL

CROSS-REFERENCE TO RELATED APPLICATIONS

This application claims the priority filing benefit of International PCT Application PCT/GB2004/004900 filed Nov. 20, 2004, to be published under PCT 21(2) in the English language and Great Britain Patent Application Serial No. GB 0407210.4 filed Mar. 31, 2004.

This invention relates to polymeric garment material, garments and methods of making polymeric garment material.

Polymeric materials are currently used for a wide range of garments, some of these garments (for example, raincoats and aprons) make use of the protective properties of the material, other garments (for example, footwear, underwear and fashion garments) use polymeric materials because of appearance and/or feel of the material.

Figure 2:
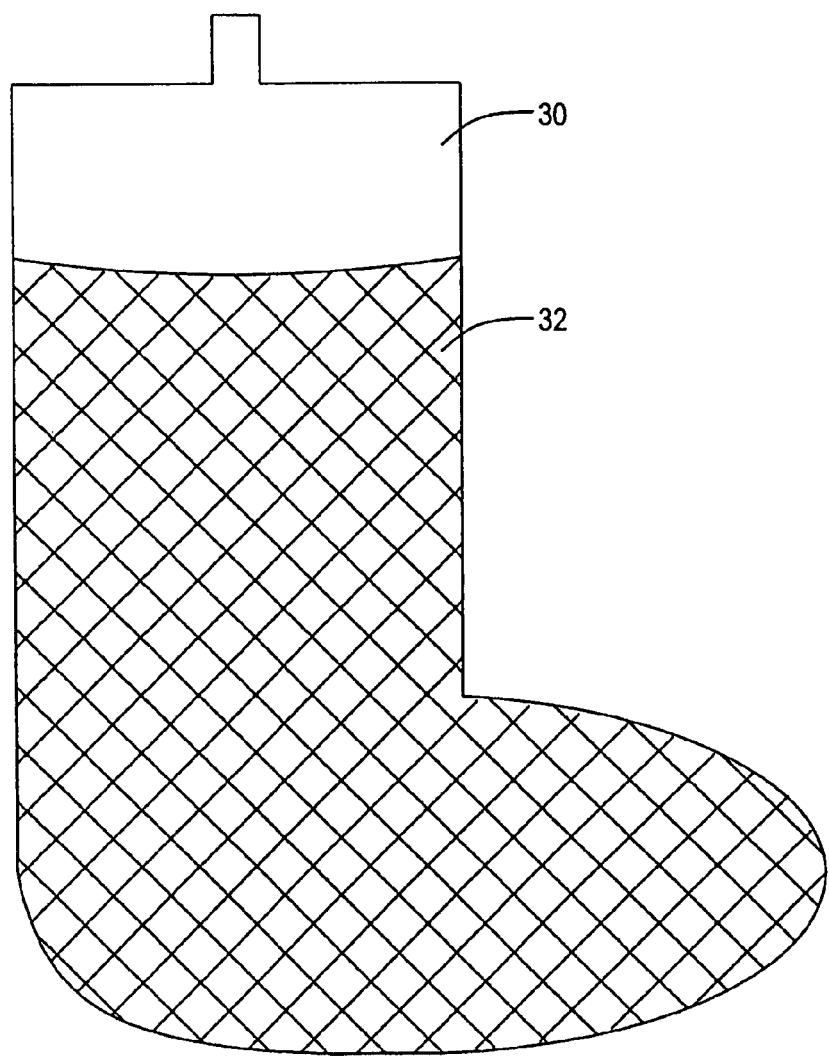

FIG. 1 illustrates the steps of a known method of producing a knitted nylon garment that has a polyurethane (PU) coating. At step 10 a knitted nylon lining is fitted on to a mould. The nylon lining acts as a substrate to which the PU coating is applied. FIG. 2 illustrates a sock lining 32 fitted to a mould 30 that supports the lining 32 so that the lining 32 takes the desired shape for the finished garment. In the case illustrated the garment is a sock, however, the method is applicable to other garments. At step 12 the mould 30 (fitted with the sock lining 32) is immersed into a solution of PU and dimethylformamide (DMF). At step 14 the mould 30 is withdrawn from the solution of PU and DMF and excess solution is allowed to drain leaving a coating of the PU/DMF solution on the lining 32. At step 16 the mould is immersed in water. The immersion causes the PU coating on the lining 32 to coagulate, that is the PU coating sets. The mould 30 remains in the water for a period of 90 to 120 minutes so that the DMF solvent is leached out of the lining into the water. At step 18 the mould is removed from the water and placed in an oven to dry the PU coated nylon liner. Finally at step 20 the PU coated nylon liner is removed from the mould 30 and a PU coated nylon sock is obtained.

A major disadvantage with this process is that it uses DMF. DMF is a solvent that is known to be very toxic, and one that is easily absorbed through the skin. Therefore great care has to be taken when handling the solution of PU/DMF. In order that a safe working environment is provided the atmosphere in which the process is carried out needs to be well ventilated and provided with extraction fans.

At step 16, when the DMF is leached into water, the water will become saturated with DMF. Therefore, the water will need to be repeatedly changed—this is both time consuming and expensive. Additionally, since the DMF saturated water solution is toxic, care must be taken when disposing of the DMF saturated water so as to minimise environmental damage that may occur from the disposal.

An alternative to DMF is the use of THF (Tetra Hydro Furan). However THF is also a noxious chemical and has many of the disadvantages associated with DMF.

A further disadvantage of the process is that the PU coating penetrates the interstices of the nylon liner. Therefore, the PU coating will come into contact with the skin of a wearer of a garment made by this process if such a garment is worn next to the skin. This can cause irritation and build up of perspiration next to the skin, and, in particular, some wearers may be allergic to PU. Skin irritation may also be caused by any DMF or THF that has not been removed during the leaching step 16. DMF in particular is readily absorbed through the skin. A further hazard of DMF is that it is known to be carcinogenic and to be the cause of foetal defects.

According to a first aspect of the invention there is provided a method of making garment material, the method having the steps: providing a substrate; applying coagulant to a substrate; applying a foam of the polymeric material to the substrate; allowing the coagulant to coagulate some of the foam leaving some of the foam uncoagulated; and removing uncoagulated foam from the substrate to leave a layer of the coagulated polymeric material on the substrate.

The use of foamed (aerated) polymeric material removes the need for the polymeric material to be dissolved in DMF, THF or, indeed, any other solvent. Therefore, the method is less hazardous and more environmentally friendly. The garment material produced by the method will not contain potentially harmful traces of solvent.

The coagulant may be allowed to coagulate some of the foam for a period in the range 60 to 180 seconds. The step of removing uncoagulated foam may comprise removing an outer layer of the foam to leave an inner layer of coagulated polymeric material on the substrate. The outer layer may be removed before a skin has formed on the outer surface of the foam layer.

A wide range of polymeric materials are suitable for production of the foam, these include nitrile latex, natural latex, polyvinylchloride (PVC), polyvinylacetate (PVA) neoprene (polychloroprene) and rubber as well as PU latex. The foam may be produced from one of or a blend of two or more of these polymeric materials. Hence, the method provided by the invention is more widely applicable than the known method (illustrated in FIG. 1), which is restricted to the use of PU.

The substrate may be, for example, knitted nylon but a wide range of materials may be used as the substrate, for example, the substrate may be one of, or a blend of two or more of: cotton, spandex, lycra, polyester, aramid, dyneema, acrylic, carbon conductive fibre, copper conductive fibre, thunderon conductive fibre, multifilament yarn spun from liquid crystal polymer (available under the brand name Vectran™), tactel, CoolMax™, ThermaStat™, Thermax™ and Viafil®. For example, the substrate may be a blend of nylon and lycra and may comprise a blend of 95% nylon and 5% lycra. Such a blend is particularly comfortable to wear, the garment conforming well to the shape of the wearer.

Preferably, the step of removing the uncoagulated foam comprises directing a fluid at the substrate. For example a spray of liquid such as water may be directed at the substrate. Alternatively, the fluid may be a gas, which may be at least predominantly air. The gas may be directed as a jet. The spray of liquid or jet of gas may have a pressure in the range 1 to 10, or more preferably in the range 1 to 4 bar. The fluid may be directed at an angle in the range 0° to 45° to the normal to the surface of the substrate.

Alternatively, the step of removing uncoagulated foam from the substrate may comprise immersing the substrate in liquid, for example water.

After removing the uncoagulated foam from the substrate, the method may further comprise the step of immersing the substrate in water to remove coagulant. The substrate may then be dried, for example by placing the substrate in an oven.

A number of suitable coagulants may be used. The coagulant may be either an aqueous solution or an alcoholic solution of one or more electrolytes. The electrolytes may comprise one or more of formic acid, acetic acid, calcium nitrate and calcium chloride.

Before applying coagulant to the substrate, the substrate may be placed on a mould, which may be composed of one or more of metal, ceramic, fibreglass and plastic. The mould may take the form of a portion of the garment or, alternatively, may take the form of a complete garment. The garment may, for example, be a coat, an apron, a boot, a shoe, a sock, an otem of underwear, a glove or a corset.

Surprisingly, this method of removing the excess, uncoagulated foam leaves behind a cohesive, porous and breathable layer of polymeric material on the substrate. A garment made from the garment material produced in this way allows perspiration to escape from the wearer of the garment and reduces heat build up within the garment.

The garment material is more flexible and lightweight and garments made from the garment material are more comfortable to wear than garments produced by the prior art method illustrated in FIG. 1.

The penetration of the foam into the substrate may be controlled so that the foam does not fully penetrate the substrate. In this way, the garment material produced has an inner surface that does not have exposed polymeric material. This is advantageous since many people have an allergic reaction to polymeric materials (especially latex) worn next to the skin and the non-penetrated portion of the substrate forms a barrier between the wearer of the garment and the coating of the polymeric material. The risk of further skin irritation caused by solvents such as DMF and THF is also removed since this process removes the need for such solvents. This is particularly important as DMF is readily absorbed through the skin and is known both to be carcinogenic and to cause foetal defects.

According to a second aspect of the invention there is provided garment material produced by the method of the first aspect of the invention.

According to a third aspect of the invention there is provided a garment produced by the method of the first aspect of the invention.

According to a fourth aspect of the invention there is provided a garment or garment material having a substrate and a layer of coagulated polymeric material penetrating at least partially the substrate, the garment or garment material having a water vapour permeability in the range 3.5 to 6.5 mg·cm$^{-2}$·h$^{-1}$.

According to a fifth aspect of the invention there is provided a garment or garment material having a substrate and a layer of coagulated polymeric material penetrating the substrate, wherein the polymeric material does not fully penetrate the substrate.

According to a sixth aspect of the invention there is provided a garment or garment material having a substrate and a layer of coagulated polymeric material penetrating at least partially the substrate, wherein the garment or garment material has a water vapour permeability in the range 3.5 to 6.5 mg·cm$^{-2}$·h$^{-1}$. Preferably the garment or garment material has a water vapour permeability in the range 5.0 to 6.5 mg·cm$^{-2}$·h$^{-1}$.

According to a seventh aspect of the invention there is provided a garment or garment material which, when subjected to a temperature of 20±2° C. and a relative humidity of 65±2% for 265 minutes, will hold between 1.0 mg and 8.5 mg of water per cm$^2$ of the garment or garment material.

Preferably the garment or garment material, when subjected to a temperature of 20±2° C. and a relative humidity of 65±2% for 265 minutes, will hold between 1.0 mg and 5.5 mg of water per cm$^2$ of the garment or garment material.

According to an eighth aspect of the invention there is provided a method of applying discrete areas of polymeric coating to the layer of coagulated foam of a garment or garment material produced by the method of the first aspect of the invention. The method may further comprise at least one of the steps of: washing the garment or garment material to remove residue; partially drying the garment or garment material; providing an array former; and dressing the garment or garment material on the array former before applying the polymeric coating; and then curing the layer of coating; and stripping the garment or garment material from the array former after applying the polymeric coating.

Preferably, the garment or garment material is washed with a solution of water and detergent. The garment or garment material is preferably partially dried at a temperature of around 50-70° C. Advantageously, only partially drying the washed garment or garment material so that the layer of coating is applied to a damp coagulated polymeric layer improves the bonding between the layer of coating and the coagulated foam.

The layer of coating may comprise one of or a blend of two or more of nitrile latex, natural latex, PU latex and latex and preferably has a viscosity of around 100-400 poise.

The layer of coating may be cured for 30-45 min at a temperature of 60-140° C. Alternatively, the layer of coating may be cured in two stages. The first stage may comprise 15-30 min at 60-80° C. The second stage may comprise 20-40 min at 120-150° C. The layer of coating may have a thickness of around 0.2-2.0 mm before curing, which may be reduced to around 0.05-1.0 mm after curing.

The array of discrete areas of coating may comprise an array of dots or alternatively may comprise a combination of an array of dots and strengthening patches.

According to a ninth embodiment of the invention there is provided a garment or garment material produced by the eighth aspect of the invention.

According to a tenth aspect of the invention there is provided apparatus for producing garment material comprising a mould arranged to support a substrate, foam application means arranged to apply a foam of a polymeric material to the substrate, and foam removing means arranged to remove uncoagulated foam from the substrate to leave a layer of coagulated polymeric material on the substrate.

The apparatus may further comprise dot application means arranged to apply a dot coating to the layer of coagulated polymeric material.

The apparatus may also comprise at least one of washing means arranged to remove any residue from the garment material, drying means arranged to partially dry the washed garment material, and curing means arranged to cure the dot coating.

Figure 3:
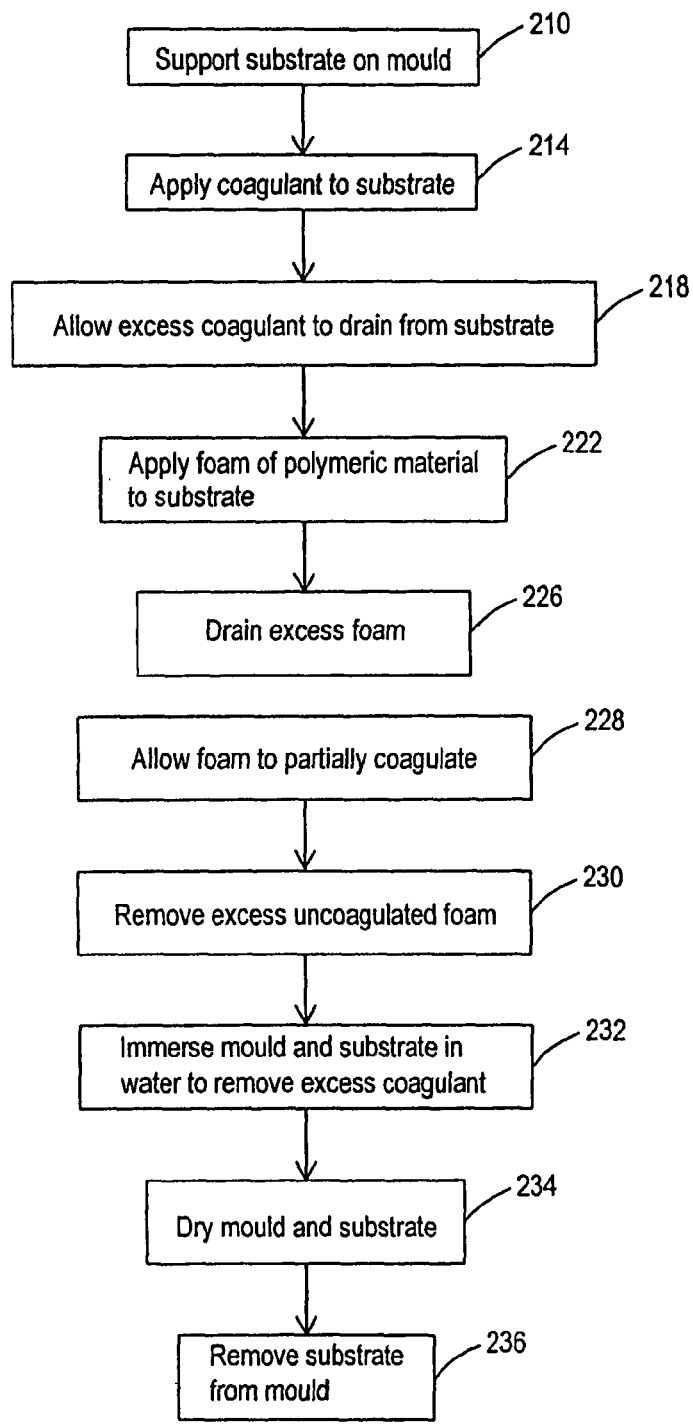
Figure 4:
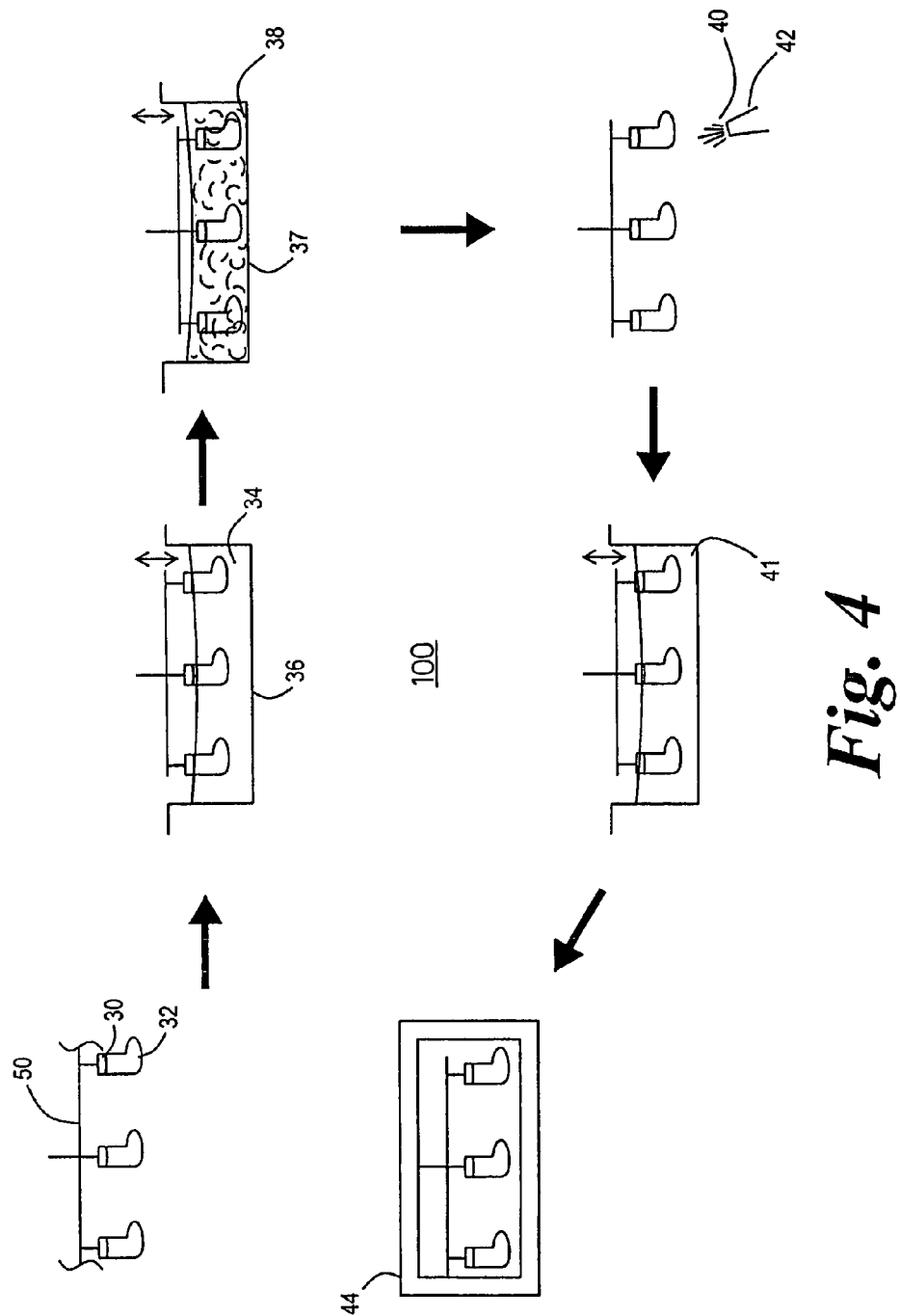

Preferred embodiments of the present invention will now be described, by way of example only, with reference to the accompanying drawings in which:

FIG. 1 schematically illustrates a prior art method of making polyurethane coated garments;

FIG. 2 schematically illustrates a substrate that has been placed on a mould;

FIG. 3 schematically illustrates a method of making garment material according to an embodiment of the invention;

FIG. 4 schematically illustrates a system for making garment material according to an embodiment of the invention;

FIG. 5 schematically illustrates a plan view of a flight bar to which several moulds are mounted;

FIG. 6 schematically illustrates a side view of the flight bar of FIG. 5, the flight bar being translated into a spraying station;

FIG. 7 schematically illustrates a side view of a garment substrate in a section of the spraying station of FIG. 6 in which nozzles are pointing upwards;

FIG. 8 schematically illustrates a side view of a garment substrate in a section of the spraying station of FIG. 6, in which nozzles are pointing horizontally; and FIG. 9 schematically illustrates a side view of a garment substrate in a section of the spraying station of FIG. 6, in which nozzles are pointing downwards.

Figure 10:
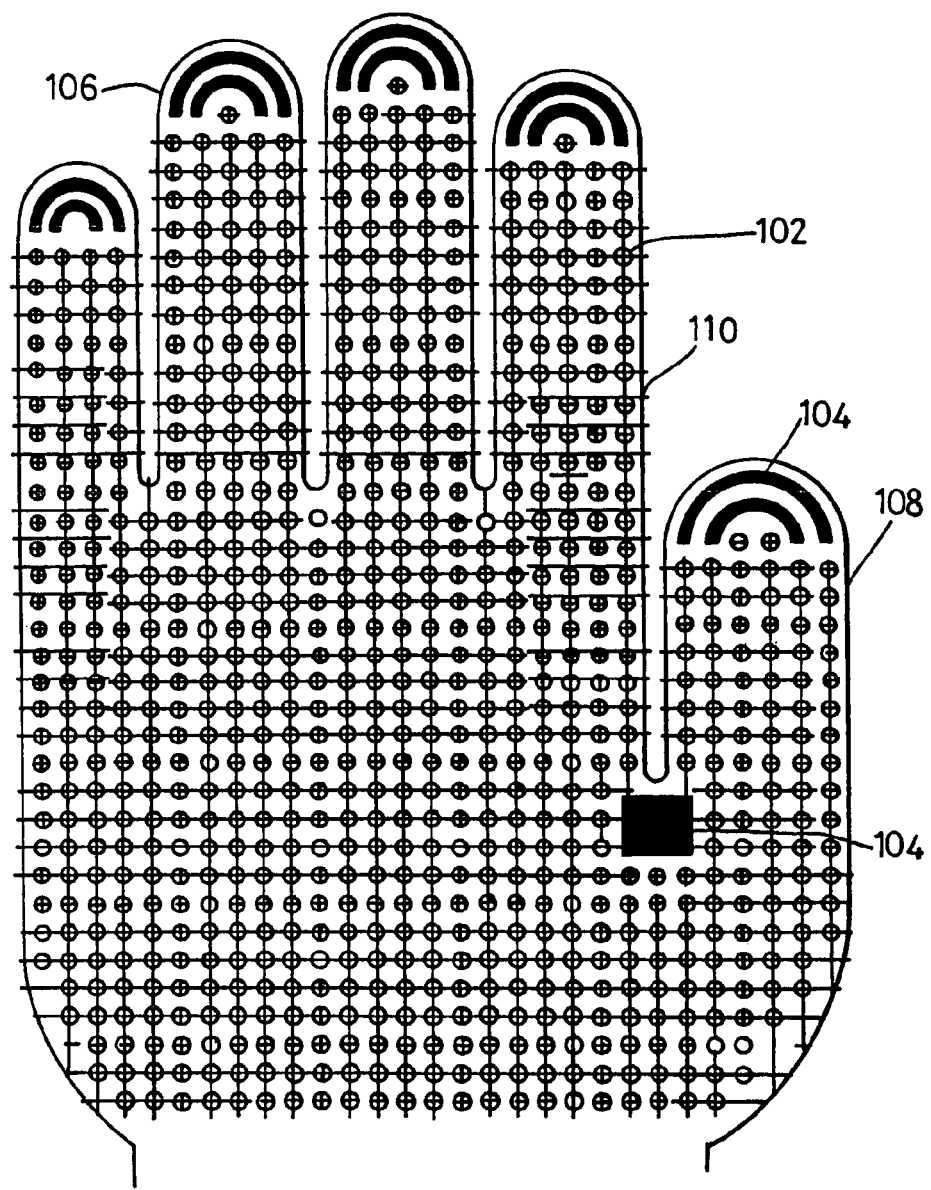

FIG. 10 illustrates a discrete array of areas of polymeric coating applied to the surface of a garment or garment material produced using the method of FIG. 3.

Figure 11:
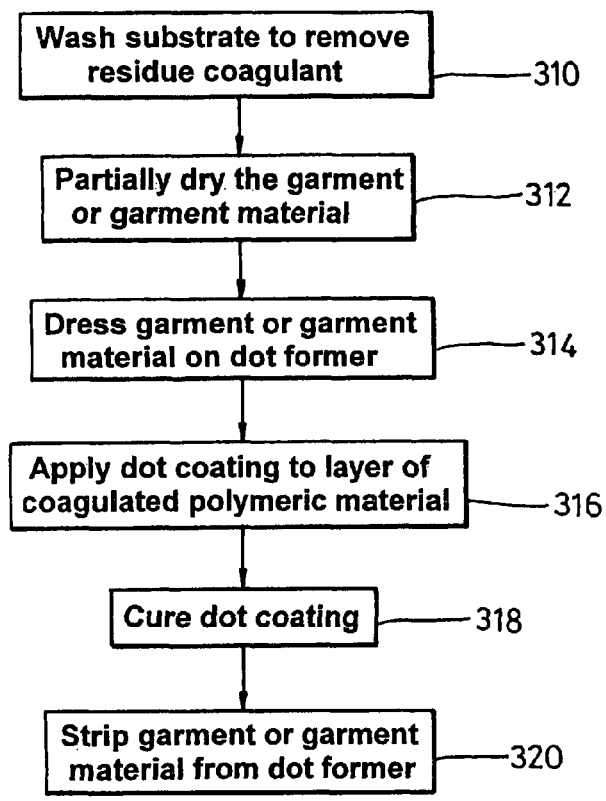

FIG. 11 schematically illustrates a method of applying a discrete array of areas of polymeric coating to the surface of a garment or garment material produced using the method of FIG. 3.

Figure 12:
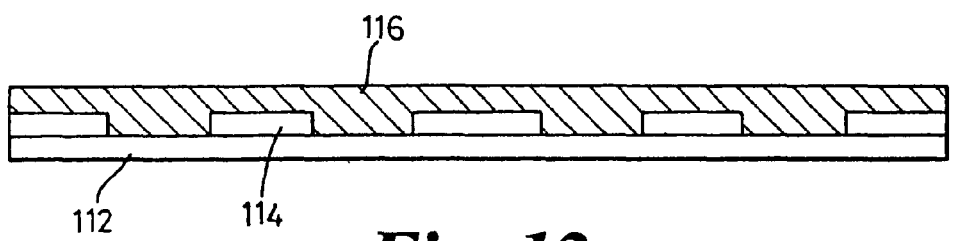

FIG. 12 schematically illustrates a cross section through the garment or garment material of FIG. 10.

Referring to FIGS. 3 and 4, to make a garment according to an embodiment of the invention, at step 210 a lining or substrate 32 is fitted to a mould 30. The mould 30 supports the substrate 32 during the various process steps that are applied to the substrate 32 to produce the garment material. After the garment material has been made it is removed from the mould 30.

The substrate 32 may take the form of a complete garment, for example, a sock (as is illustrated in FIG. 2) or in a form that is a section of a garment, for example a pocket for a coat. In such cases the mould 32 provides the correct shape for the finished garment or garment section. When the mould takes the shape of a finished garment it is preferable that the substrate 32 fitted on to the mould 30 is seamless so that the finished garment is also seamless. Alternatively, the mould 32 need not take any particular form and sheets of garment material are formed by the process. For example, the substrate may be stretched out between two clamps or rollers, and for the purpose of this specification the term "mould" covers arrangements of clamps, rollers and the like that support the substrate 32 by applying tension to the substrate 32. In this case, garment or garment sections are produced by further processing of the sheets of garment material for example by pieces being cut from the sheet of garment material and then the pieces being used to make a garment.

The mould 30 may be made from, for example, metal, porcelain, fibreglass or plastic.

Suitable materials for the substrate 32 include one of, or a blend of two or more of: nylon, cotton, spandex, lycra, polyester, aramid, dyneema, acrylic, carbon conductive fibre, copper conductive fibre, thunderon conductive fibre, multifilament yarn spun from liquid crystal polymer (available under the brand name Vectran™), tactel, CoolMax™, ThermaStat™, Thermax™ and Viafil®. For example, the substrate could comprise a blend of 95% nylon and 5% lycra. The substrate 32 has a lattice structure and may be formed by knitting, weaving or some other known process.

The process may be applied to batches of substrates ('batch-processing) such that the process steps are applied to a group of moulds 30, each mould 30 supporting a substrate 32. Alternatively, the process may be applied continuously such that the moulds 30 are continuously translated through the system 100. Of course, the moulds 30 may be continuously translated through some parts of the system 100 and stationary for periods of time at other parts of the system 100 according to what particular process step is occurring at those positions. Referring to FIG. 5, the moulds 30, bearing the substrates 32 are mounted in a row on a bar 50, termed a "flight bar". In the example illustrated, four pairs of moulds 30 (bearing four pairs of gloves respectively) are mounted on a flight bar 50. The flight bar 50 moves in a linear direction from one process station to another at a set speed. Of course, the speed at which the flight bar is set can be varied. There may be several flight bars 50, each flight bar 50 being at a different stage of the process, and the movement of a flight bar 50 from one station to the next is at set intervals.

At step 214 coagulant 34 is applied to the substrate 32. This may be achieved by immersing the substrate 32 (supported on the mould 30) into a bath or trough 36 containing the coagulant 34 or by spraying the coagulant 34 onto the substrate 32. The coagulant 34 is an aqueous or alcoholic solution of electrolytes. Suitable electrolytes include formic acid, acetic acid, calcium nitrate, calcium chloride or a mixture of two or more of these. Ethanol may be used to provide the alcoholic solution of electrolytes but other alcohols are also suitable, for example, iso-propyl alcohol and methanol may also be used.

At step 218 excess coagulant 34, i.e. coagulant that is not absorbed by the substrate 32 is allowed to drain from the substrate 32. If the coagulant 34 was applied by immersion in a bath/trough 36 of coagulant 34 then step 218 involves withdrawal of the mould 30 from the bath/trough 36.

Alternatively, to apply the coagulant to the substrate, the substrate can be pressed onto a sponge saturated with coagulant. This method reduces the amount of coagulant picked up by the substrate, avoiding the need to allow time for excess coagulant to drain from the substrate.

At step 222 a foam 38 of polymeric material is applied to the substrate 32, for example by immersing the mould 30 supporting the substrate 32 into a bath/trough 37 of the foam 38. The production of a foam 38 of polymeric material is well known to a skilled person. The foam 38 may be formed from one of, or combination of, several polymeric materials. Suitable polymeric materials include PU latex, nitrile latex, natural latex, polyvinylchloride (PVC), polyvinylacetate (PVA), neoprene (polychloroprene) and rubber. The foam 38 has a density in the range 15-35%, i.e. there is 15-35% air by volume in the foam and a viscosity in the range 80-180 poise (8-18 $Ns/m^2$). The foam 38 contains thickeners so that the foam 38 is of the required viscosity. The thickeners are usually added to the polymeric material when the polymeric material is in liquid form, i.e. before it is aerated. Examples of thickeners include polyvinyl alcohol (0.2-0.6 parts per 100 parts polymeric material by volume) methyl cellulose (0.2-0.8 parts per 100 parts polymeric material by volume) and polyacrylate (0.2-0.6 parts per 100 parts polymeric material by volume). The foam also contains stabilisers so that the foam 38 is stable (i.e. does not degrade to a liquid) and curatives that provide the polymeric coating obtained from the foam with mechanical strength so that the coating is resistant to, for example, abrasion, punctures and tearing. The stabilisers and curatives are usually added to the polymeric material when the polymeric material is in liquid form. Examples of stabilisers include diphenyl guanidine alcohol (with a concentration of about 0.5 parts per 100 parts polymeric material by volume) and alkali casein (0.3-0.8 parts per 100 parts polymeric material by volume). Although the thickeners, stabilisers and curatives are normally added to the liquid polymeric material before it is aerated, they can also be added after aeration, for example if modification of the foam properties is required (for example by adding more thickener to increase the viscosity of the foam).

At step 226 the substrate 32 is removed from the foam 38 and excess foam is allowed to drain from the substrate 32 to leave a layer of foam 38 on the substrate 32. The foam is arranged, as described in more detail below, not to pass through the substrate 32, but to remain on the outer surface or pass part way through the substrate. The foam therefore forms a layer on the outside of the substrate 32.

At step 228 the foam 38 reacts with the coagulant 34 that has been absorbed by the substrate 32 causing coagulation of the foam 38.

Only partial coagulation of the foam 38 is required, therefore, the foam 38 is allowed to react with the coagulant 34 for a limited period of time. After this period of time the foam closest to the substrate 32 will be coagulated but the degree of coagulation progressively decreases with distance from the substrate 32 so that the outer surface of the foam will not be coagulated (i.e., the outer surface will be wet). Typically the foam 38 is allowed to react with the coagulant 34 for a period in the range of 60-180 seconds before the excess (uncoagulated) foam 38 is removed. This period is controlled so that the underside of the foam layer that is in contact with the substrate 32 coagulates, but the outer part of the foam layer does not coagulate. Therefore, a film skin is not formed on the outer surface of the foam layer. The foam layer has a thickness in the range 0.5-1.5 mm.

At step 230 the outer layer of excess, uncoagulated foam 38 is removed from substantially the whole area of the foam layer on the substrate 32. This may be done by directing one or more sprays of water 40 at the substrate 32. The water is directed at the substrate 32 via one or more nozzles 42. Each spray of water 40 has a pressure in the range 1-4 bar ($1 \times 10^5$-$4 \times 10^5$ N/m$^2$). The spraying process lasts for about 5-20 seconds.

The nozzles 42 may be stationary with a set orientation relative to the substrate 32. Alternatively, the nozzles 42 may be moveable so that the orientation of the nozzle 42 relative to the substrate 32 can be varied during the spraying process. The nozzles 42 may also be translatable relative to substrate 32 during the spraying process to provide good coverage of the substrate 32 with the spray 40. It is also possible to use a continuous jet instead of a spray, however, a spray is preferred since this makes more economical use of water.

Referring to FIGS. 6 to 9, according to an embodiment of the invention the moulds 30, bearing the substrates 32, are translated on a flight bar 50 to a spraying station 52. FIGS. 6 to 9 illustrate the substrate 32 in the form of a glove lining with the fingers of the glove lining pointing downwards (of course the invention is applicable to sock linings and other garment substrates). The spraying station 52 comprises a number of spay nozzles 42. The nozzles form two rows 43 that are orientated so that the nozzles of one row sprays the front of the substrate 32 (e.g. the palm side of the glove linings 32) whilst the nozzles of the other row spray the back of the substrate 32 (e.g. the backhand side of the glove linings 32). The nozzles 42 are in a fixed position with a pre-set spaying angle and the nozzles 42 do not move during the spraying process. The spraying angle of each nozzle 42 is in the range 0 to 45° to the horizontal (the horizontal being the normal to the surface of the substrate 32) and the spraying angle may be adjusted before the spraying process. The nozzles 42 may be arranged as pairs with a nozzle 42a on one row facing a nozzle 42b of the other row. The nozzles 42a, 42b may be set at different angles: for example the pair of nozzles 42a, 42b may point upwards at about 45° to the horizontal as illustrated in FIG. 7; the nozzles 42a, 42b may point horizontally as illustrated in FIG. 8; or the nozzles 42a, 42b may point downwards at 45° to the horizontal illustrated in FIG. 9. It is not necessary for the nozzles 42a, 42b in each pair to be orientated at the same angle to the horizontal.

As water is pumped through the nozzles 42 the flight bar 50 is translated vertically through the spray produced by the nozzles 42. For example, the moulds 30 are first moved downwardly through the sprays and then upwardly through the spray as the moulds are moved through the spraying station on the flight bar 50.

Other fluids could be used to remove the foam 38, for example a jet of compressed air could be directed at the substrate 32. The foam 38 could also be removed by immersing the substrate 32 in a bath/trough of an aqueous medium. The aqueous medium may comprise an anti-foam agent such as an emulsion of organo-modified polysiloxanes in the concentration range 0.01-0.1% by volume or a blend of petroleum and amorphous silica in the concentration range 0.2-0.8% by volume.

The removal of the excess foam 38, by directing fluid at the substrate 32, leaves behind a cohesive, porous and breathable layer of polymeric material on the substrate 32. At this stage of the process the layer of polymeric material has a thickness in the range 0.34-1.0 mm.

At step 232 excess coagulant 34 is removed from the substrate 32. This may be done by immersing the substrate 32 into a bath/trough of water 41; typically the immersion is for a period of about 15 minutes.

At step 234 the substrate 32 with its layer of polymeric material is dried. The drying may be done in an oven 44 which may be fitted with one or more fans that distribute the heat evenly throughout the oven 44. The drying could also be achieved by directing air over the substrate 32. The air may be dried and/or heated before it is directed over the substrate 32.

After being dried, the layer of polymeric material has a thickness in the range 0.26-0.80 mm.

At step 236, the garment material, comprising the substrate 32 with the polymeric coating, is removed from the mould 30.

The garment material produced by the above process has a uniform porosity.

The penetration of the foam 38 into the substrate 32 can be controlled so that the foam does not fully penetrate the substrate 32. In this way, the garment material produced has an inner surface with no, or very little, exposed polymeric material. This is advantageous since many people are have an allergic reaction to polymeric materials (especially latex) worn next to the skin and the non penetrated portion of the substrate 32 would form a barrier between the wearer of the garment and the coating of the polymeric material.

The penetration of the foam into the substrate (and the porosity of the finished garment material) can be controlled by varying a number of parameters including:
  i. the formulation of the polymeric material;
  ii. the formulation of the coagulant;
  iii. the time between applying the coagulant and applying the foam;
  iv. the time between applying the foam and removing excess (uncoagulated) foam;
  v. foam density;
  vi. foam viscosity; and
  vii. the weight and construction of the substrate.

The parameter values disclosed in the description provide fabric material that has the desired properties, however, the skilled person may achieve the advantages of the invention using a method having parameters that vary from those given.

The garment material produced by the invention is particularly suitable for gloves, for example gardening gloves and gloves used for light assembly (for example the assembly of electronic components). Such gloves (particularly gloves for light assembly) need to provide the wearer with a high degree of dexterity and, when the gloves are worn for a long period of time, the hands need to be kept cool, dry and comfortable. Gloves made by the process of the invention allow perspiration to escape from the glove/be absorbed by the glove and the hands of the wearer are not irritated by the glove (either by heat build up, sweat, solvent residue or polymeric material present on the lining of the glove). The increased flexibility of the polymeric coating, compared to the coatings of prior art garment material, allows for better dexterity and usability of the gloves.

Gloves made according to the invention were tested for water vapour permeability and absorption of water. The tests were performed on samples taken from four different gloves at a temperature of 20±2° C. and a relative humidity of 65±2%. The thickness of all these samples was 1.08 mm. The results of these tests are given in table 1.

For comparison, samples from four prior art gloves were also tested under the same conditions. The prior art gloves were made by using a solution of polyurethane (PU) dissolved in DMF according to the method illustrated in FIG. 1. The thickness of each of these samples was 1.03 mm with an area of 18 cm$^2$. The results for these tests are given in Table 2.

The water vapour permeability figures are given in units of milligrams of water that pass through a square centimeter of the sample in one hour ($mg \cdot cm^{-2} \cdot h^{-1}$). The absorption figures are given in milligrams of water absorbed by the whole sample as measured, with equivalents per square centimeter of the samples in brackets, after set periods of time at a temperature of 20±2° C. and a relative humidity of 65±2%.

TABLE 1

Test results for samples taken from gloves according to an embodiment of the invention

|  | Sample 1 | Sample 2 | Sample 3 | Sample 4 |
|---|---|---|---|---|
| Permeability ($mg \cdot cm^{-2} \cdot h^{-1}$) | 5.77 | 3.94 | 6.16 | 5.38 |
| Absorption (mg.) after 265 minutes | 45 (2.5 cm$^{-2}$) | 111 (6.2 cm$^{-2}$) | 32 (1.8 cm$^{-2}$) | 67 (3.7 cm$^{-2}$) |
| Absorption (mg.) after 400 minutes | 44 (2.4 cm$^{-2}$) | 143 (7.9 cm$^{-2}$) | 28 (1.6 cm$^{-2}$) | 69 (3.8 cm$^{-2}$) |

TABLE 2

Test results for samples taken from prior art gloves made using a solution of PU in DMF

|  | Sample 1 | Sample 2 | Sample 3 | Sample 4 |
|---|---|---|---|---|
| Permeability ($mg \cdot cm^{-2} \cdot h^{-1}$) | 10.47 | 10.39 | 10.47 | 10.33 |
| Absorption (mg.) after 265 minutes | 1 (0.06 cm$^{-2}$) | 2 (0.11 cm$^{-2}$) | 3 (0.17 cm$^{-2}$) | 1 (0.06 cm$^{-2}$) |
| Absorption (mg.) after 400 minutes | 3 (0.17 cm$^{-2}$) | 1 (0.06 cm$^{-2}$) | 2 (0.11 cm$^{-2}$) | 0 (0 cm$^{-2}$) |

The average permeability of the samples taken from the gloves according to embodiment of the invention was 5.3 $mg \cdot cm^{-2} \cdot h^{-1}$ whereas for the samples taken from the prior art gloves the average permeability was 10.4 $mg \cdot cm^{-2} \cdot h^{-1}$.

The tests were performed by an independent test organisation (SATRA Technology Centre, Kettering, Northamptonshire, UK). This organisation uses the following classification for water vapour permeability:

| Very High permeability | over 5.0 $mg \cdot cm^{-2} \cdot h^{-1}$ |
|---|---|
| High permeability | between 2.6 and 5.0 $mg \cdot cm^{-2} \cdot h^{-1}$ |
| Moderate permeability | between 1.0 and 2.5 $mg \cdot cm^{-2} \cdot h^{-1}$ |
| Low permeability | under 1.0 $mg \cdot cm^{-2} \cdot h^{-1}$ |

Therefore, both sets of samples can be considered to have very high permeability (with the exception of sample 2 of Table 1). It can be seen that the permeability of the prior art gloves is much higher than the gloves made according to the method of this invention. However, when the gloves of the current invention are worn there is significantly less build of perspiration than when the prior art gloves are worn. This can be explained by considering the absorption figures: the gloves embodying the invention absorb far more water than the prior art gloves. Therefore, for the gloves embodying the invention, when worn, some of the perspiration is taken from the hand of the wearer and held in the glove and some of the perspiration permeates (i.e. escapes from) the glove, hence there is less perspiration build on the inner surface of the glove. It is believed that the gloves embodying the invention absorb more water because the polymer layer has larger interstitial spaces compared to the prior art due to the method of manufacture of the gloves (i.e., the method of the invention uses foamed polymer which is then washed off, for example with a water spray, before fully coagulating, whereas, for the prior art method the glove liner/substrate is dipped in a solution of polymer and then immersed in water to coagulate the polymer solution). The interstitial spaces give the gloves a 'wicking action', that is water is pulled into the gloves by capillary action.

According to a further embodiment of the invention, an array of discrete areas of polymeric material is applied to the surface of the gloves so that it covers areas of the foamed and coagulated polymer to provide a protective coating. For example, this could comprise an array of dots. This coating of polymeric material increases the abrasion resistance of the layer of coagulated polymeric foam. Referring to FIG. 10, the dots 102 are applied in an array across the surface of the glove. Additional patches of the coating 104 are applied to particular parts of the surface of the glove, such as between the finger portions and at the fingertips. These are areas that are likely to be subjected to greater wear or abrasion and where larger patches of abrasion resistive coating are particularly valuable.

In the embodiment shown in FIG. 10, the dots 102 are circular and spaced evenly across the surface of the glove. The further reinforcing patches 104 on the fingertips 106 are in the form of semi-circular strips and a further area is applied between the thumb 108 and the index finger 110. However, it will be appreciated that areas of coating of any shape and size could be applied to a garment. For example, the reinforcing patches on the fingertips could be solid areas of coating and areas could be applied between each finger. The coating could also be applied to garments other than gloves. For example, an area of coating could be applied to the heel of a sock and an array of smaller discrete areas could be applied to the sole.

FIG. 11 illustrates the steps of applying the discrete areas of a polymer coating of FIG. 10 to the layer of coagulated polymeric foam of a garment. After the gloves have been produced using the method of FIG. 3, the foam-coated gloves are washed with a solution of cold water and detergent at step 310 to remove any residual coagulant left in the glove coating. This removal of any residual coagulant is important for achieving good adhesion between the dots and the foam coating. The gloves may be washed by immersion into a bath/trough of the water and detergent or alternatively, jets of water and detergent may be sprayed onto the gloves through nozzles such as those in spraying station 52 used in an earlier step of glove production. At step 312 the gloves are partially dried at a temperature of between about 50° C. and 70° C. until damp. The damp condition of the gloves further improves the adhesion of the dots to the foam coating.

In order to apply the dots, the partially dry gloves are dressed onto flat formers, shown at step 314. A dot coating can then be applied at step 316, either manually or using a machine. The thickness of the dot coating applied should be around 0.2-2.0 mm. The dotting compound may be one of a number of suitable polymeric materials such as nitrile latex, natural latex, PU latex; latex or a blend of two or more of these and should have a viscosity of about 100 to 400 poise.

At step 318 the dotted gloves are cured in an oven, such as oven 44 for a period of between 30 and 45 min at a temperature of 60° C.-140° C. Alternatively, the dot coating may be cured in two stages. The first stage comprises 15-30 min at 60° C.-80° C. and the second comprises 20-40 min at 120° C.-150° C. The thickness of the dot coating after curing is reduced to around 0.05-1.0 mm. Latex polymers are used because they cure at lower temperatures than the PVC known to be used for the dots on prior art gloves. Latex polymers are also known to have better abrasion resistance than PVC. The final stage of the dotting process, shown at step 320, involves manually stripping the glove from the dot former. The resulting thickness of the foam coating and dot layer of the finished glove is around 0.3-1.8 mm.

FIG. 12 illustrates the layers of substrate 112, porous coagulated foam 114 and polymeric coating 116. Dots applied to prior art gloves can be easily rubbed off due to the poor bonding between the dots and the coating. However, the porous foam coating 114 of the gloves according to this invention means that material of the dots 116 extends through the pores 118 in the foam 114 and anchors itself to the foam coating 114, improving the bonding between the dots and the coating.

There are a number of parameters controlling the bonding between the liner and the dots. These include:
 i. the formulation of the polymeric material;
 ii. the formulation of the polymeric foam;
 iii. foam density;
 iv. the temperature and time period for curing the dot coating;
 v. the viscosity of the dot coating; and
 vi. weight and construction of the garment or garment material.

It will be appreciated that any of these factors may be varied to achieve the optimum bonding.

The invention claimed is:

1. A method of making garment material, the method having the steps:
  fitting a substrate onto a mould;
  applying a coagulant to the substrate and then applying a layer of foam of a polymeric material to the substrate;
  allowing for the coagulant to coagulate some of the foam for a controlled period so that an underside of the layer of foam polymeric material, which is closest to the substrate, coagulates to form a coagulated layer and an outer part of the foam layer does not coagulate and forms an uncoagulated layer;
  removing the uncoagulated foam layer before a film skin can form on the layer of foam, to leave a cohesive, porous, and breathable coagulated layer of polymeric material on the substrate, wherein the controlled period is such that the garment or garment material when subjected to a temperature of 20+2° C. and a relative humidity of 65±2% for 265 minutes, will hold between 1.0 mg and 8.5 mg of water per $cm^2$ of the garment material; and
  removing the garment material comprising the substrate and the coagulated polymeric material from the mould.

2. The method of claim 1, wherein the step of removing the uncoagulated foam comprises directing a fluid at the substrate.

3. The method of claim 2, wherein the fluid is a liquid.

4. The method of claim 2, wherein the fluid is a gas.

5. The method of claim 1, wherein the step of removing the uncoagulated foam from the substrate comprises immersing the substrate in liquid.

6. The method of claim 1 wherein the substrate comprises knitted nylon.

7. The method of claim 1 wherein the substrate is a blend of 95% nylon and 5% lycra.

8. The method of claim 1 comprising the step of immersing the substrate in water to remove coagulant after the step of removing the uncoagulated foam from the substrate.

9. The method of claim 8 comprising the step of drying the substrate after the step of immersing the substrate in water.

10. The method of claim 1, wherein the coagulant is an aqueous solution of one or more electrolytes.

11. The method claim 1, wherein the coagulant is an alcoholic solution of one or more electrolytes.

12. The method of claim 1, wherein the polymeric material comprises at least one of: nitrile latex, natural latex, polyurethane latex, polyvinyl chloride latex, neoprene and polyvinylacetate.

13. The method of claim 1, further comprising the step of applying a coating in an array of discrete areas to the layer of coagulated polymeric material.

14. The method of claim 13 further comprising at least one of the steps of:
  washing the garment material to remove residue;
  partially drying the garment material;
  providing an array former; and
  dressing the garment material on the array former before applying the coating; and
  then curing the layer of coating; and
  stripping the garment material from the array former.

15. The method of claim 13, wherein the layer of coating comprises at least one of: nitrite latex, natural latex, PU latex and latex.

16. The method of claim 13 wherein the array of discrete areas of coating comprises an array of dots.

17. The method of claim 13 wherein the array of discrete areas of coating comprises a combination of an array of dots and strengthening patches.

18. A method of making garment material, the method having the steps:
  fitting a substrate onto a mould;
  applying a coagulant to the substrate and then applying a layer of foam of a polymeric material to the substrate;
  allowing for the coagulant to coagulate some of the foam for a controlled period so that an underside of the layer of foam polymeric material, which is closest to the substrate, coagulates to form a coagulated layer and an outer part of the foam layer does not coagulate and forms an uncoagulated layer;

removing the uncoagulated layer before a film skin can form on the layer of foam, to leave a cohesive, porous, and breathable coagulated layer of polymeric material on the substrate; and removing the garment material comprising the substrate and the coagulated polymeric material from the mould.

* * * * *